United States Patent [19]
Frasier et al.

[11] Patent Number: 5,268,677
[45] Date of Patent: Dec. 7, 1993

[54] REDUCED VIEWPORT FOR GRAPHICS DISPLAY

[75] Inventors: Richard A. Frasier, Grass Valley; F. Andrew Witek, Nevada City; William C. Lange, Grass Valley; Neil R. Olmstead; Charles Q. Hoard, both of Nevada City, all of Calif.

[73] Assignee: The Grass Valley Group, Inc., Nevada City, Calif.

[21] Appl. No.: 228,087

[22] Filed: Aug. 4, 1988

[51] Int. Cl.5 ............................ G09G 1/00; G06F 3/14
[52] U.S. Cl. .................................... 345/118; 395/127; 345/139
[58] Field of Search ............... 340/731, 729, 721, 724; 395/119, 127, 139

[56] References Cited

U.S. PATENT DOCUMENTS

| | | | |
|---|---|---|---|
| 4,295,135 | 10/1981 | Sukonick | 340/731 |
| 4,549,275 | 10/1985 | Sukonick | 340/729 |
| 4,725,960 | 2/1988 | Shima et al. | 340/731 |
| 4,786,897 | 11/1988 | Takanashi | 340/721 |
| 4,790,028 | 12/1988 | Ramage | 340/731 |

OTHER PUBLICATIONS

Artwick, B. A.; "Microcomputer Displays, Graphics, & Animation", Prentice-Hall, N.J., Englewood Cliffs, 1985, pp. 42–45, 38–39, 194–203, 204–225.

Primary Examiner—Alvin E. Oberley
Assistant Examiner—Steven J. Saras
Attorney, Agent, or Firm—John Smith-Hill; Francis I. Gray

[57] ABSTRACT

A reduced viewport feature for a graphics display system allows an operator to observe manipulations on a graphics display of video image planes that are wholly or partially outside a viewing area. A two-dimensional input image plane in the form of a wireframe is transformed to a three-dimensional image plane due to manipulation, such as rotation and/or translation. The resulting three-dimensional image plane is subsequently mapped as a two-dimensional projection onto the graphics display. Transformation matrix coefficients are multiplied by a variable reduction coefficient to cause all points of the image plane to converge toward the center of the graphics display, resulting in the ability to view space which originally was not visible to the operator on an output video monitor.

9 Claims, 4 Drawing Sheets

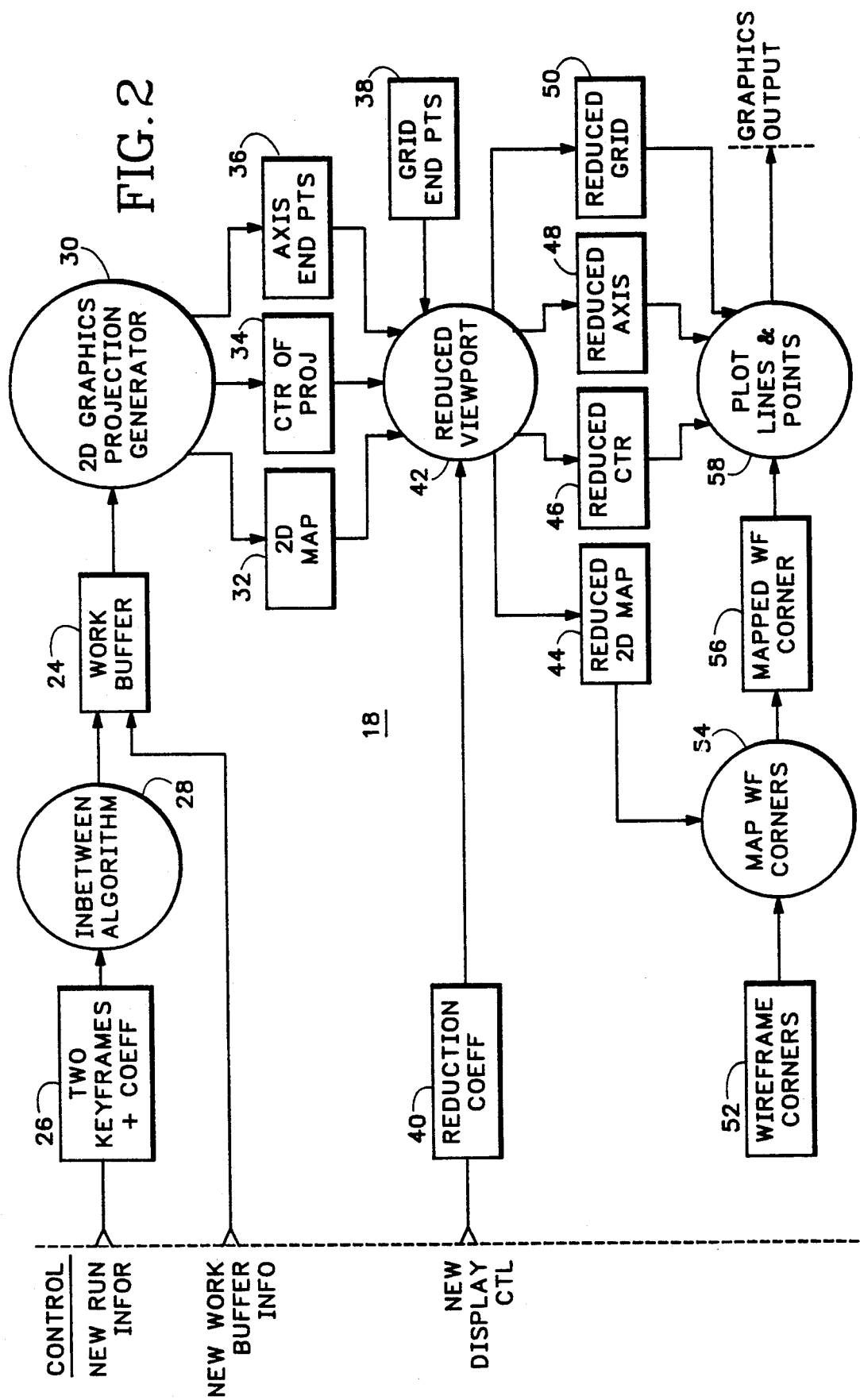

REDUCED VIEWPORT FOR GRAPHICS DISPLAY

BACKGROUND OF THE INVENTION

The present invention relates to graphics display systems, and more particularly to a reduced viewport feature for a graphics display system that allows an operator to observe on a graphics display the manipulation of an image which exists totally or partially outside the visible portion of an output video monitor.

One function of a graphics display system is to manipulate a two-dimensional video image in a three-dimensional universe. Actually an operator manipulates a plane upon which the video image is projected. The image plane may appear in that portion of the three-dimensional universe displayed on the output video monitor, or may be partially or totally outside the viewing area of the output video monitor. When the image plane is not completely displayed on the output video monitor, the operator attempting to manipulate the image plane cannot observe completely the effect of the manipulation until the image plane is brought totally within the viewing area of the output video monitor.

What is desired is a reduced viewport that allows an operator to observe the manipulation of the video image plane anywhere in the three-dimensional universe.

SUMMARY OF THE INVENTION

Accordingly the present invention provides a reduced viewport feature for a graphics display system that reduces the size of the normally visible area on an output video monitor to make visible on a graphics display the area outside the viewing area of the output video monitor. A set of 2-D input points is transformed into a set of 3-D points that in turn is mapped as a projection into a set of 2-D output screen points for the graphics display. Four corner points are mapped for a wireframe from the 2-D input space into the 2-D output screen and then connected by line segments. The wireframe represents an image plane upon which a video picture is projected, the wireframe being manipulated under control of an operator. The mapping function is scaled using matrix multiplication with a variable reduction coefficient that results in converging the set of 2-D output screen points toward the center of the graphics display without changing the apparent perspective projection of the set of 2-D input points. This results in bringing wireframes, or portions of wireframes, and other display parameters into view on the graphics display that were otherwise outside of the viewing area of the output video monitor.

The objects, advantages and other novel features of the present invention are apparent from the following detailed description when read in conjunction with the appended claims and attached drawing.

BRIEF DESCRIPTION OF THE DRAWING

FIG. 2 is a block diagram of the graphical display system according to the present invention.

DESCRIPTION OF THE PREFERRED EMBODIMENT

Figure 1:
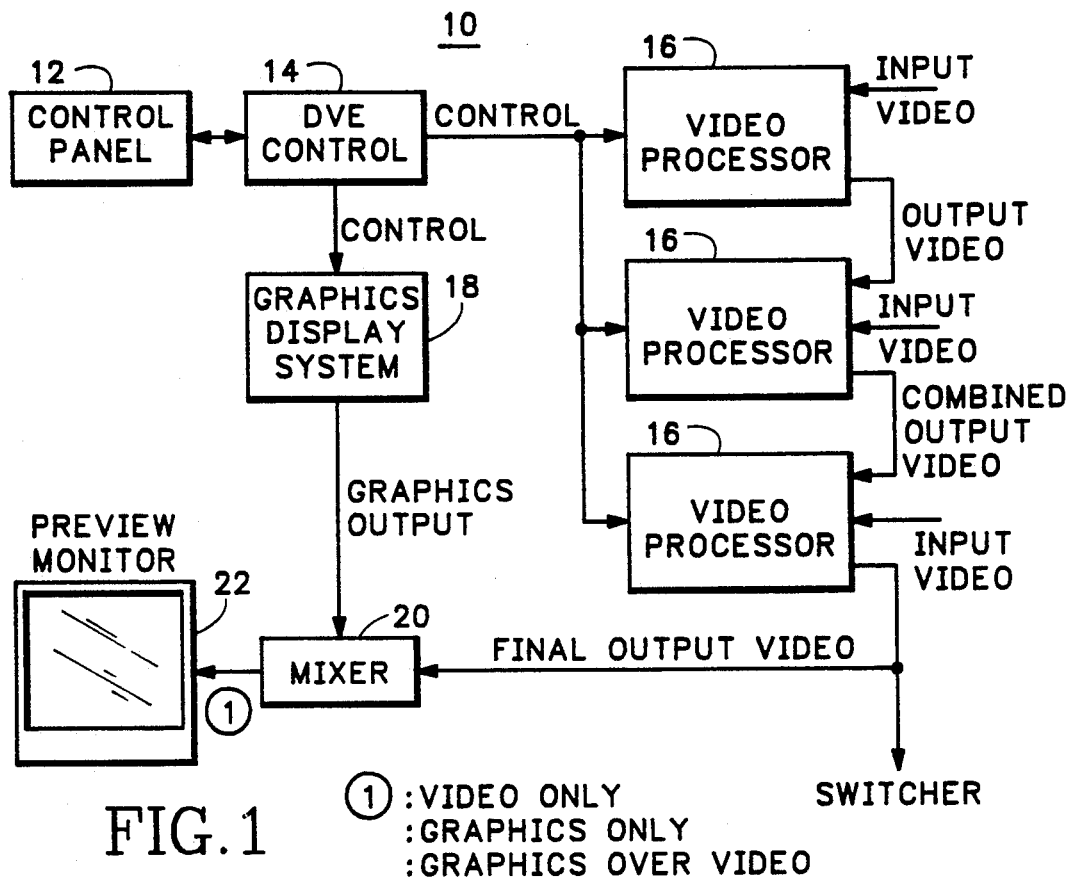
FIG. 1 is a block diagram of a digital video effects device that has a graphical display system using a reduced viewport according to the present invention.

Referring now to FIG. 1 a digital video effects system 10 is shown having a control panel 12 that serves as an operator interface and interacts with a controller circuit 14. The controller circuit 14 provides control signals to various video processors 16 and to a graphics display system 18. The video processors 16 receive input video from various sources, such as video tape recorders, video cameras, character generators, matte generators and the like, and in combination provide a final output video for display. The graphics display system 18 provides a graphics output video. The graphics output video and final output video are input to a mixer 20 which provides as an output the final output video only, the graphics output video only or graphics output video over the final output video. In the present implementation when the graphics display 22 displays the final output video, either with or without the graphics output, it acts as an output video monitor. Only when the graphics display 22 is displaying graphics output only is the reduced viewport function of the present invention activated. The final output video also is input to a standard television production switcher (not shown) for further mixing, transmission on the air and display on an on/air video monitor (not shown). The output of the mixer 20 is input to a graphics display 22 so that an operator may see the results of the manipulation of the various input videos.

The graphics display system 18 has two modes of operation as shown in FIG. 2, either direct transfer of transformation parameters from the controller circuit 14 to a working buffer 24, or run information for interpolating between keyframes. The direct transfer of transformation parameters relays any changes in the orientation information made by the operator via the control panel 12 using a joystick and/or a keypad to the working buffer 24 over the control bus. The run information provides the orientation of two keyframes and an inbetweening coefficient to an input buffer 26, and an inbetween algorithm 28 computes from the run information a new set of transformation parameters for storage in the working buffer 24.

Based upon the transformation parameters stored in the working buffer 24, however originated, a two-dimensional projection generator algorithm 30 calculates rotation axis vertex and end points, a center of projection point and a two-dimensional mapping function, and stores them in intermediate buffers 32, 34, 36. Grid endpoints, prior to application of the reduced viewport function, are constant regardless of the transformation parameters in the working buffer 24 since the grid endpoints are already in the 2-D output screen space, and are stored in a grid buffer 38. These grid endpoints define a grid for the viewing area of the output video monitor that serves to demarcate the viewing area. These points and the mapping function from the 2-D projection generator algorithm 30 refer to the two-dimensional projection onto the graphics display 22 of the 2-D input points through a 3-D transformation.

A variable, user controlled, reduction coefficient from the controller bus is stored in a coefficient buffer 40 and applied as an input to a reduced viewport algorithm 42 together with the points and mapping function from the 2-D projection generator algorithm 30 and with the grid endpoints. The resulting reduced viewport points and mapping function from the reduced viewport algorithm 42 are stored in respective buffers 44, 46, 48, 50 and have the effect of mapping all the points closer to the center of the graphics display 22. A wireframe buffer 52 contains constant wireframe corner input, which points are input to a wireframe mapping algorithm 54 together with the reduced viewport 2-D mapping function. The resulting mapped wireframe corners are stored in a reduced mapped wireframe buffer 56. The reduced viewport points and the mapped wireframe corner points are input to a line and point plot algorithm 58 to produce the graphics output for display on the graphics display 22. The line and point plot algorithm 58 provides the points between the respective corners and endpoints to produce connecting lines.

Figure 3:
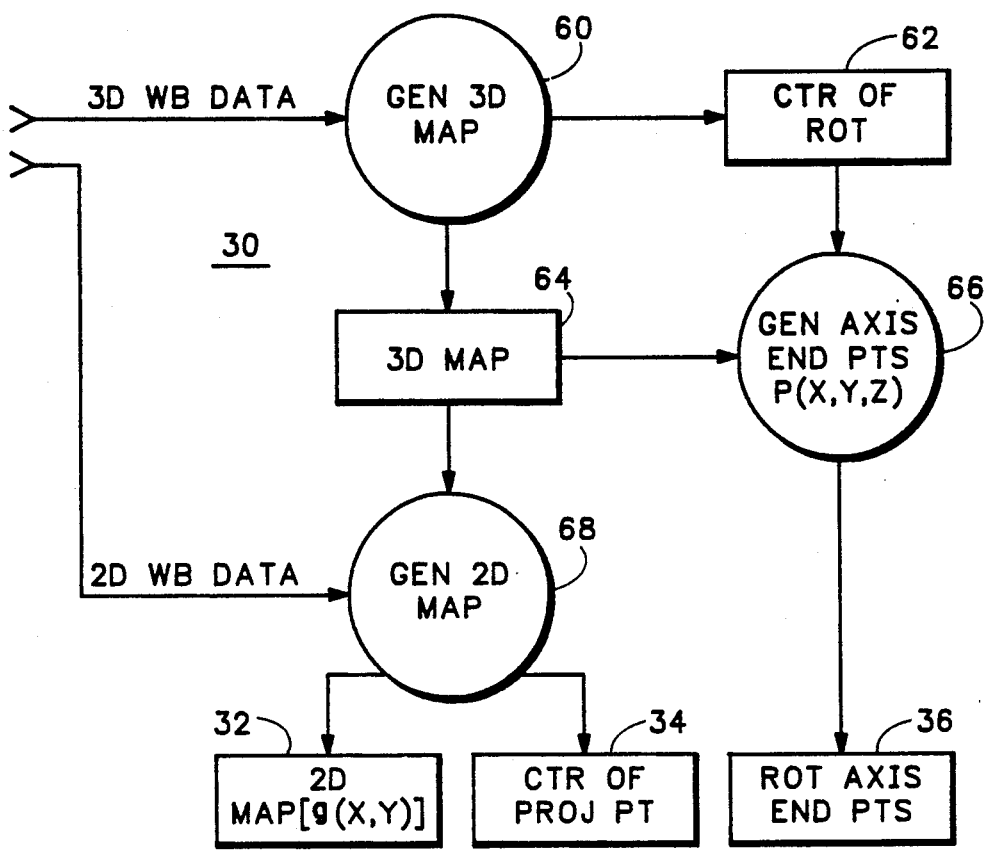
FIG. 3 is a block diagram of a two-dimensional graphics projection generator for the graphical display system of FIG. 2.

The 2-D graphics projection algorithm 30 uses the transformation parameters from the working buffer 24 to generate the 2-D maps, center of projection point and axis end points upon the graphics display 22. As shown in FIG. 3 3-D transformation data from the working buffer 24 is input to a 3-D mapping algorithm 60 to produce a 3-D center of rotation and a 3-D mapping function in respective buffers 62, 64. The 3-D mapping function and the center of rotation are input to a rotation axis endpoint generator 66 to produce the rotation axis endpoints and vertex. The 3-D mapping function also is input to a 2-D mapping generator 68 together with 2-D transformation data from the working buffer 24, such as the center of projection point, to produce the 2-D mapping function and the center of projection.

Figure 4:
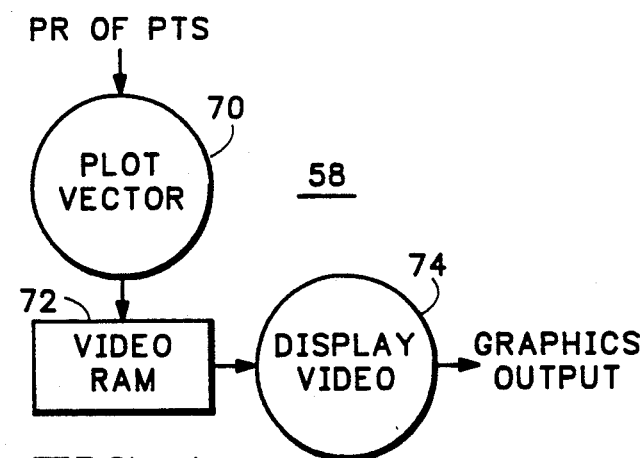
FIG. 4 is a block diagram of a plot generator for the graphical display system of FIG. 2.

The plot line and point algorithm 58 as shown in FIG. 4 takes a set of 2-D points to plot individual points and line segments between points. A plot vector algorithm 70 is in the form of an incremental line plotting algorithm where individual points are considered to be vectors of length equal to one picture element (pixel). The vectors from the plot vector algorithm 70 are stored in a video RAM 72. The scan lines in the video RAM 72 are organized in a progressive order to simplify plotting. Adjacent scan lines therefore correspond to spatially adjacent scan lines on the graphics display 22, but are temporally displaced by one television field during a display video algorithm 74. The video RAM 72 is read synchronously with the final output video signal from the video processors 16. The display video algorithm 74 processes the video RAM values through a grey scale mapper to produce the digital graphics output video signal. The graphics output is converted to an analog white signal in the mixer 20 and linearly added either to the final output video or to a color black signal as selected by the operator.

Figure 5:
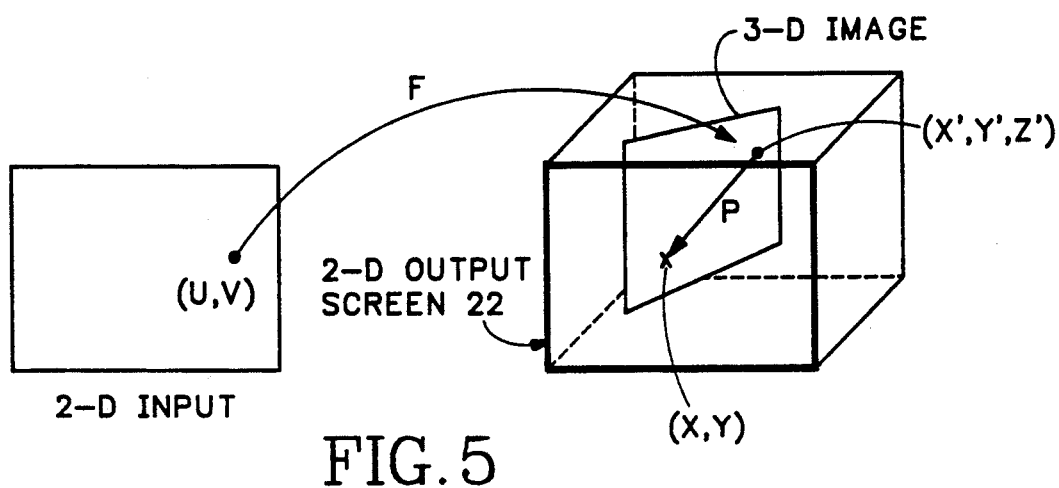
FIG. 5 is a graphical representation of the mapping functions for the graphical display system of FIG. 2.

The actual manipulation of 2-D image planes in three dimensions is illustrated in FIG. 5 and is performed by software operating within the graphics display system 18. Let f be the transformation from a set of 2-D input points, (u,v), into a set of 3-D points, (x',y',z'). Also let p be the projection which maps the 3-D points into a set of 2-D output screen points, (x,y). Then $$g(u,v) = p(f(u,v)) = (x,y)$$

where g is a mapping from the 2-D input space into the 2-D output screen.

The 2-D mapping function, g, in matrix form can be represented by $$\begin{vmatrix} A & D & G \\ B & E & H \\ C & F & I \end{vmatrix}$$

To map an input point (u,v) to an output point (x,y) the following matrix multiplication is performed $$\begin{vmatrix} u & v & 1 \end{vmatrix} * \begin{vmatrix} A & D & G \\ B & E & H \\ C & F & I \end{vmatrix} = \begin{vmatrix} Au+Bv+C & Du+Ev+F & Gu+Hv+I \end{vmatrix}$$

To preserve the homogeneity of the system all three terms of the product matrix are divided by $Gu+Hv+I$ to produce $$|(Au+Bv+C)/(Gu+Hv+I) \quad (Du+Ev+F)/(Gu+Hv+I) \quad 1|$$

So for some input point (u,v) the corresponding output point is computed as $$x = (Au+Bv+C)/(Gu+Hv+I)$$

$$y = (Du+Ev+F)/(Gu+Hv+I)$$

By multiplying the first two columns of the mapping function g by a reduced viewport variable coefficient R, the desired reduced viewport function is obtained. The matrix form of g becomes $$\begin{vmatrix} AR & DR & G \\ BR & ER & H \\ CR & FR & I \end{vmatrix}$$

and the output points (x,y) become $$x = (ARu+BRv+CR)/(Gu+Hv+I)$$

$$y = (DRu+ERv+FR)/(Gu+Hv+I)$$

By applying the reduced viewport coefficient R to the mapping function, all subsequent mappings are subject to the same scaling.

Figure 6:
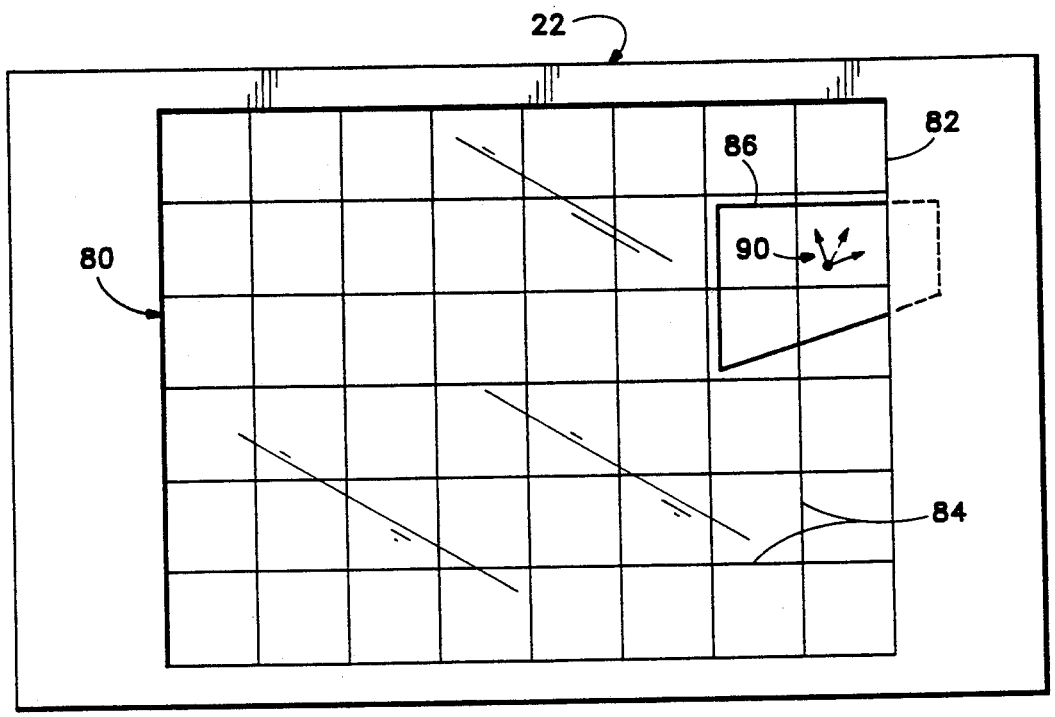
FIG. 6 is a screen display without a reduced viewport.
Figure 7:
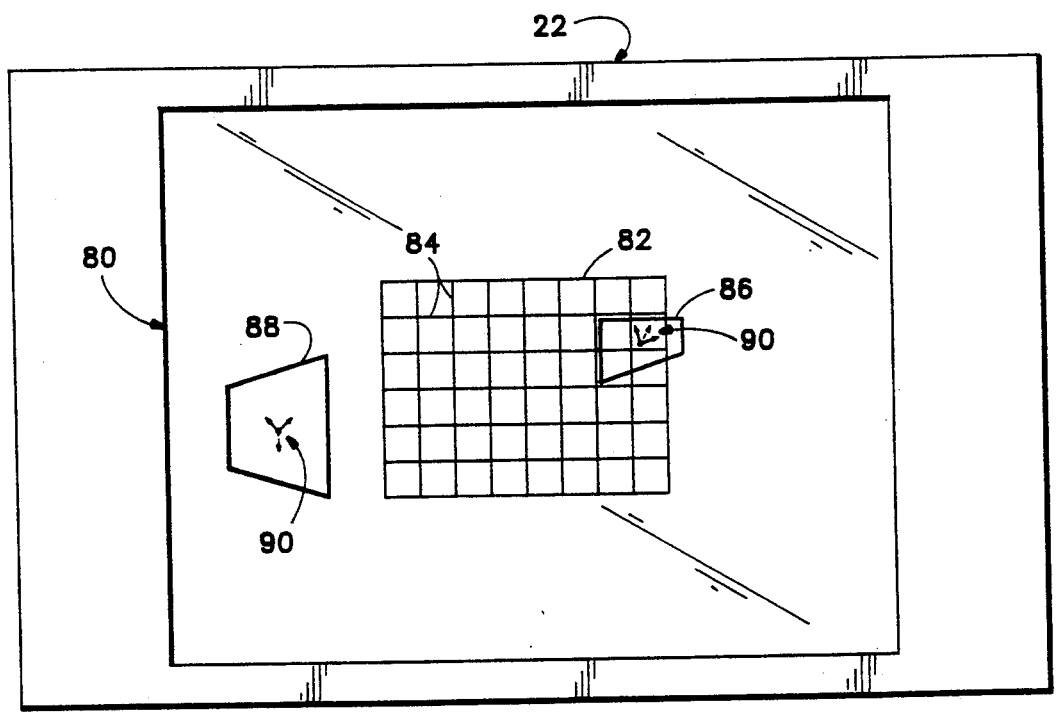
FIG. 7 is a screen display using the reduced viewport feature of the present invention.

The output of the graphics display system 18 is shown in FIGS. 6 and 7 as a reduced viewport graphics only display on the graphics monitor 22. On the cathode ray display surface 80 of the graphics monitor 22 an outline 82 is shown which represents the viewing area of the output video monitor. The outline 82 may include grid lines 84 to demarcate the viewing area. The area of the display surface 80 outside the outline 82 represents the remaining "universe" within which an image plane 86, represented by a wireframe, may be manipulated. The actual image plane 86 location may be wholly or partially within the scene depicted by the outline 82, or may exist entirely within the remaining universe outside the outline. The outline 82 as shown in FIG. 7 represents the reduced viewport of the present invention. An operator by means of a knob or the like at the control panel 12 may control the amount of reduction. As the amount of reduction is increased, the outline 82 becomes smaller and smaller and more of the formerly invisible universe becomes visible around it on the display surface 80. Now an operator can manipulate the image plane 86 completely out of the outline 82 and know where it is with respect to the output video monitor viewing area represented by the outline. FIG. 7 shows a second image plane 88 that was invisible in FIG. 6, but which becomes visible on the graphics display 22 when the reduced viewport function is used.

Thus the present invention provides a reduced viewport for making visible on a graphics display the area outside the viewing area of an output video monitor when manipulating video image planes by performing a transformation from a 2-D input space to the 2-D graphics display screen using matrix multiplication and a variable reduction coefficient.

What is claimed is:

1. A reduced viewport for use with a graphics display system comprising:
    means for generating an outline of a viewing area on a display;
    means for mapping a set of 2-D input points into a set of 2-D output screen points for display on the display at a desired position and with a desired apparent perspective; and
    means for scaling the outline and the set of 2-D output screen points in response to a variable scaling factor to converge the set of 2-D output screen points toward the center of the display so that an area outside the outline is visible on the display.

2. A reduced viewport as recited in claim 1 wherein the mapping means comprises:
    means for transforming the set of 2-D input points into a set of 3-D points; and
    means for projecting the set of 3-D points into the set of 2-D output screen points.

3. A reduced viewport as recited in claim 1 wherein the mapping means comprises:
    means for matrix multiplying the set of 2-D input points with a matrix mapping function; and
    means for extracting the set of 2-D output screen points from the matrix product produced by the multiplying means.

4. A reduced viewport as recited in claim 3 wherein the scaling means comprises means for multiplying a portion of the matrix mapping function by the variable scaling factor so that the set of 2-D output screen points from the extracting means is scaled by a desired amount to produce the reduced viewport.

5. A reduced viewport as recited in claim 1 wherein the 2-D input points define the corners of a wireframe representing a video image plane to be manipulated.

6. A reduced viewport as recited in claim 5 wherein the 2-D input points further define a set of rotational axes for the wireframe.

7. A reduce viewport as recited in claim 6 wherein the mapping means comprises:
    means for transforming the set of 2-D input points into a set of 3-D points; and
    means for projecting the set of 3-D points into the set of 2-D output screen points.

8. A reduced viewport as recited in claim 6 wherein the mapping means comprises:
    means for matrix multiplying the set of 2-D input points with a matrix mapping function; and
    means for extracting the set of 2-D output screen points from the matrix product produced by the multiplying means.

9. A reduced viewport as recited in claim 8 wherein the scaling means comprises means for multiplying a portion of the matrix mapping function by the variable scaling factor so that the set of 2-D output screen points from the extracting means is scaled by a desired amount to produce the reduced viewport.

* * * * *